United States Patent [19]
D'Amico

[11] 3,839,303
[45] Oct. 1, 1974

[54] INHIBITING PREMATURE VULCANIZATION WITH AMINOTHIOPYRIMIDINES

[75] Inventor: John Joseph D'Amico, Saint Louis, Mo.

[73] Assignee: Monsanto Company, St. Louis, Mo.

[22] Filed: June 22, 1972

[21] Appl. No.: 265,216

Related U.S. Application Data

[63] Continuation-in-part of Ser. No. 107,560, Jan. 18, 1971.

[52] U.S. Cl.......... 260/79.5 B, 260/247.1, 260/251, 260/780
[51] Int. Cl. .................... C08f 27/06, C08c 11/60
[58] Field of Search...... 260/79.5 B, 251 QB, 247.1, 260/780

[56] References Cited
UNITED STATES PATENTS
3,513,139  5/1970  Coran ................................ 260/79.5

FOREIGN PATENTS OR APPLICATIONS
795,174  5/1958  Great Britain..................... 260/79.5

*Primary Examiner*—Joseph L. Schofer
*Assistant Examiner*—C. A. Henderson, Jr.

[57] ABSTRACT

A method is disclosed for inhibiting the premature vulcanization of rubber with compounds of the formula

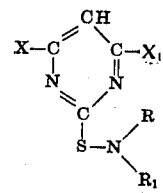

wherein X and $X_1$ independently are hydrogen or lower alkyl, R is hydrogen, alkyl, aralkyl or cycloalkyl, $R_1$ is alkyl, aralkyl or cycloalkyl or R and $R_1$ together with the nitrogen atom form a heterocycle selected from the group consisting of morpholino, alkyl substituted morpholino and

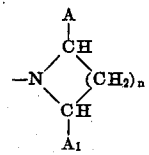

wherein A and $A_1$ independently are hydrogen or lower alkyl and $n$ is 2 to 6.

6 Claims, No Drawings

INHIBITING PREMATURE VULCANIZATION WITH AMINOTHIOPYRIMIDINES

This application is a continuation-in-part of application Ser. No. 107,560 filed Jan. 18, 1971 now abandoned.

This invention relates to an improved process for preparing vulcanizable rubber and to the rubber stocks obtained by using the improved process. The invention relates to improved accelerator-inhibitor combinations for rubber. The invention also relates to compounds useful as inhibitors of premature vulcanization in rubber. More particularly, the invention relates to a method for preventing the premature vulcanization of rubber stocks and to the rubber stocks obtained by using this method.

BACKGROUND OF THE INVENTION

Premature vulcanization has been partially controlled by delayed action accelerators of which the widely used thiazolesulfenamides are a notable example. Pyrimidinesulfenamides have been suggested as accelerators of vulcanization, British Pat. No. 795,174, May 21, 1958, but never achieved acceptance.

SUMMARY OF THE INVENTION

According to this invention, it has been discovered that pyrimidinesulfenamides inhibit prevulcanization if added to a vulcanizable elastomer along with a sulfur vulcanizing agent and any of the commonly used organic accelerators. Although the property of inhibiting prevulcanization appears to be a general characteristic of pyrimidinesulfenamides, a significant feature of this invention is that the performance of delayed action thiazolesulfenamide accelerators is significantly improved by conjoint use with a pyrimidinesulfenamide. The pyrimidinesulfenamides utilizable in the practice of the invention may be represented by the formula

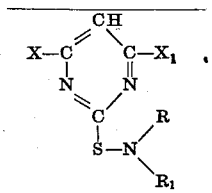

where X and $X_1$ independently are hydrogen or lower alkyl, R is hydrogen, alkyl, aralkyl or cycloalkyl, $R_1$ is alkyl, aralkyl or cycloalkyl or R and $R_1$ together with the nitrogen atom form a heterocycle selected from the group consisting of morpholino, alkyl substituted morpholino and

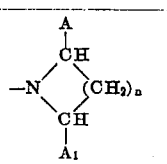

where A and $A_1$ independently are hydrogen or lower alkyl and n is 2 to 6. The alkyl radicals may be primary, secondary or tertiary and the alkyl chain may be branched or unbranched. Alkyl radicals of 1 to 20 carbon atoms are suitable with radicals of 1 to 10 carbon atoms being preferred. Lower alkyl means radicals of 1 to 5 carbon atoms. Cycloalkyl radicals of 5 to 12 carbon atoms are suitable with radicals of 5 to 8 carbon atoms being preferred. Aralkyl is a monovalent alkyl radical having a phenyl radical attached to a carbon atom of the alkyl chain. Aralkyl radicals of 7 to 10 carbon atoms are preferred.

Examples of R and $R_1$ are methyl, ethyl, propyl, isopropyl, butyl, isobutyl, sec-butyl, tert-butyl, amyl, hexyl, octyl, decyl, dodecyl, cetyl, eicosyl, cyclopentyl, cyclohexyl, cyclooctyl, cyclodecyl, cyclododecyl, benzyl, alpha-methyl benzyl, alpha, alpha-dimethyl benzyl and phenethyl. Examples of amino radicals, wherein R and $R_1$ together are alkylene, are pyrrolidinyl, 2,5-dimethyl pyrrolidinyl, piperidino, 2-methylpiperidino, 2,6-dimethylpiperidino, hexamethyleniminyl(hexahydro-1H-azepin-1-yl), hexahydro-1(2H)-azocin-1-yl and octahydro-1H-azonin-1-yl.

Examples of the compounds of the invention are 2-(dimethylaminothio)pyrimidine, 2-(dibutylaminothio)-pyrimidine, 2-(dihexylaminothio)-4,6-dimethylpyrimidine, 2-(dibenzylaminothio)pyrimidine, 2-(dibenzylaminothio)-4,6-dimethylpyrimidine, 2-(dicyclopentylaminothio)pyrimidine, 2-(dicyclohexylaminothio)-4,6-dimethylpyrimidine, 2-(dicyclooctylaminothio)pyrimidine, 2-(methylaminothio)pyrimidine, 2-(methylaminothio)-4,6-dimethylpyrimidine, 2-(ethylaminothio)pyrimidine, 2-(propylaminothio)-4,6-dimethylpyrimidine, 2-(n-butylamino)-4,6-dimethylpyrimidine, 2-(hexylaminothio)pyrimidine, 2-(octylaminothio)-4,6-dimethylpyrimidine, 2-(cyclohexylaminothio)-pyrimidine, 2-(cyclohexylaminothio)-4-methylpyrimidine, 2-(tert-butylaminothio)pyrimidine, 2-(isopropylaminothio)-pyrimidine, 2-(cyclododecylaminothio)-4,6-dimethylpyrimidine, 2-(morpholinothio)pyrimidine, 2-(2,6-dimethylmorpholino)-pyrimidine, 2-(1-pyrrolidinylthio)pyrimidine, 2-(2,5-dimethyl-1-pyrrolidinylthio)pyrimidine, 2-(piperidinothio)pyrimidine, 2-(2-methylpiperidinothio)pyrimidine, 2-(hexahydro-1(2H)-azocin-1-ylthio)pyrimidine, 2-(octahydro-1H-azonin-1-ylthio)-pyrimidine, 2-(pyrrolidinylthio)-4,6-dimethylpyrimidine, 2-(2,5-dimethylpyrrolidinylthio)-4,6-dimethylpyrimidine, 2-(piperidinothio)-4,6-dimethylpyrimidine, 2-hexahydro-1(2H)-azocin-1-ylthio)-4,6-dimethylpyrimidine, 2-(octahydro-1H-azonin-1-ylthio)-4,6-dimethylpyrimidine and 2-(hexahydro-1H-azepin-1-ylthio)pyrimidine.

The compounds of this invention are excellent prevulcanization inhibitors and secondary accelerators which when added to sulfur-vulcanizable compositions provide stocks having greater processing safety which cure faster. Both properties are advantageous to the rubber manufacturer since greater processing safety eliminates wasted stocks ruined by premature vulcanization and faster cure rates increase productivity by decreasing the time an article remains in the vulcanization mold.

The inhibitors of the invention may be used in natural and synthetic rubbers or mixtures thereof. Any diene rubber having sufficient unsaturation to be sulfur vulcanizable is suitable. Examples of suitable synthetic rubbers are styrenebutadiene copolymer (SBR), isobutylene-isoprene copolymer (butyl), ethylene-propylene diene terpolymers (EPDM), butadieneacrylonitrile copolymer (nitrile), polymers of chloroprene, neoprene and synthetic polybutadiene, particularly cispolyisoprene and cis-polybutadiene.

The advantages of the invention are obtained in vulcanizable compositions containing vulcanization accelerators of various classes and mixtures thereof. For example, rubber mixes containing the aromatic thiazole accelerators which include N-cyclohexyl-2-benzothiazolesulfenamide, N,N-dialkyl-2-benzothiazolesulfenamide, 2-mercaptobenzothiazole, N-tert-butyl-2-benzothiazolesulfenamide, 2-benzothiazolediethyldithiocarbamate, 2,2'-dithiobisbenzothiazole and 2-morpholino-thiobenzothiazole may be used. The amine salts of mercaptobenzothiazole accelerators, for example the tert-butylamine salt, morpholine salt or 2,6-dimethylmorpholine salt of mercaptobenzothiazole, may be used in the invention. Thiazole accelerators other than aromatic can be used. Stocks containing other accelerators, for example dithiocarbamate accelerators, tetramethylthiuram disulfide, tetramethylthiuram monosulfide and zinc dibutyldithiocarbamate or aldehyde amine condensation products and diaryl guanidine derivatives are substantially improved. The invention is applicable to rubber mixes containing sulfur-vulcanizing agents. The amount used generally is between 0.2–3.0 parts per hundred parts rubber. For the purpose of this invention sulfur-vulcanizing agent means elemental sulfur or sulfur-containing vulcanizing agent, for example, amine disulfide or polymeric polysulfide. Rubber stocks containing antidegradants, for example, N-1,3-dimethylbutyl-N'-phenyl-p-phenylenediamine, N,N'-bis-1,4-dimethylpentyl-p-phenylenediamine, N,N'-bis-2-octyl-p-phenylenediamine and other phenylenediamines or mixtures thereof and ketone, ether and hydroxy antidegradants and mixtures thereof are substantially improved by the process of this invention.

DESCRIPTION OF THE PREFERRED EMBODIMENTS

The inhibitors of the invention are conveniently prepared at moderate temperatures by the oxidative condensation of the appropriate amine with a pyrimidinethiol. The products are recovered and purified by conventional procedures.

EXAMPLE 1

2-(Morpholinothio)-4,6-dimethylpyrimidine is prepared in the following manner: 44.2 grams (0.25 mole) of 4,6dimethyl-2-pyrimidinethiol hydrogen chloride (J. Chem. Soc. 1959, p. 525), 40 grams (0.25 mole) of 25 percent sodium hydroxide solution and 32.6 grams (0.375 mole) of morpholine are dissolved in 400 ml of isopropyl alcohol. The mixture is heated with stirring for one hour at 45°–50°C., 197 ml (0.375 mole) of (14.28 g/100 ml) sodium hypochlorite solution is added dropwise under the surface over a two hour period at the temperature of 45°–50°C. The mixture is stirred at 45°–50°C for one additional hour. The excess hypochlorite is destroyed by the addition of 5 grams of sodium sulfite dissolved in one liter of water. The product is cooled to 5°C, separated by filtration, washed with water until neutral and air dried at 25°–30°C. 24 Grams (43 percent yield) of the desired product, m.p. 99°–100°C, is obtained. After recrystallization from ethyl alcohol, the melting point remained unchanged. Analysis gives 18.51 percent nitrogen and 14.09 percent sulfur compared to 18.65 percent nitrogen and 14.23 percent sulfur calculated for $C_{10}H_{15}N_3OS$.

EXAMPLE 2

2-(2,6-Dimethylmorpholinothio)-4,6-dimethylpyrimidine is prepared by a procedure similar to Example 1 except 2,6-dimethyl morpholine is used in place of morpholine. 35 Grams (55 percent yield) of the desired product, a water insoluble solid is obtained. Recrystallized from heptane, the product melts at 73°–74°C. Analysis gives 16.03 percent nitrogen and 12.79 percent sulfur compared to 16.59 percent nitrogen and 12.66 percent sulfur calculated for $C_{12}H_{19}N_3OS$.

EXAMPLE 3

2-(Hexahydro-1H-azepin-1-ylthio)-4,6-dimethylpyrimidine is prepared by reacting 44.2 grams (0.25 mole) of 4,6-dimethyl-2-pyrimidinethiol hydrogen chloride with 50 grams (0.50 mole) of hexamethylenimine by the procedure of Example 1. 30 Grams (51 percent yield) of a solid is obtained. The product, recrystallized from heptane, melts at 62°C. The molecular weight determined in acetone is 239 compared to 237.4 theoretical. Analysis gives 60.73 percent carbon, 8.10 percent hydrogen, 17.70 percent nitrogen, 13.29 percent sulfur compared to 60.72 percent carbon, 8.07 percent hydrogen, 17.70 percent nitrogen, 13.51 percent sulfur calculated for $C_{12}H_{19}N_3S$.

EXAMPLE 4

2-(Cyclohexylaminothio)-4,6-dimethylpyrimidine is prepared in a manner analogous to Example 3 except the amine used is cyclohexylamine. 29 Grams (45 percent yield) of product is obtained. Recrystallized from heptane, it melts at 72°–73°C. Analysis gives 60.89 percent carbon, 7.97 percent hydrogen, 17.58 percent nitrogen, 13.32 percent sulfur compared to 60.72 percent carbon, 8.07 percent hydrogen, 17.70 percent nitrogen, 13.51 percent sulfur calculated for $C_{12}H_{19}N_3S$.

EXAMPLE 5

2-(tert-Butylaminothio)-4,6-dimethylpyrimidine is prepared in the following manner: 44.2 Grams (0.25 mole) of 4,6-dimethyl-2-pyrimidinethiol hydrogen chloride, 40 grams (0.25 mole) of 25 percent sodium hydroxide solution and 73.2 grams (1.0 mole) tert-butylamine are slurried in 300 ml of isopropyl alcohol. The slurry is heated with stirring for 30 minutes at 45°–50°C, 170.8 ml (0.375 mole) of (16.4 g/100 ml) sodium hypochlorite solution is added dropwise over a two hour period at the temperature of 45°–50°C. Two liquid phases are observed. After cooling to 30°C, the excess hypochlorite is destroyed by adding 5 grams of sodium sulfite. 200 Grams of sodium chloride are added and the mixture stirred for thirty minutes. The salt is filtered from the solution. The aqueous layer of the filtrate is separated. The organic layer is concentrated to about 150 ml in vacuo. 300 ml of ethyl ether is added to the concentrate and stirred for 5 minutes. The ether layer is separated and is dried with anhydrous sodium sulfate. The ether is removed in vacuum at a maximum temperature of 30°C at 1–2 mm Hg pressure. 29 Grams (55 percent yield) of an amber liquid is obtained. Analysis gives 56.80 percent carbon, 8.17 percent hydrogen, 19.73 percent nitrogen, 15.08 percent sulfur compared to 56.83 percent carbon, 8.11 percent hydrogen, 19.89 percent nitrogen, 15.17 percent sulfur calculated for $C_{10}H_{17}N_3S$. The molecular weight determined in acetone is 215 versus the theoretical value of 211.3.

EXAMPLE 6

2-(Isopropylaminothio)-4,6-dimethylpyrimidine is prepared in the same manner as Example 5 except isopropylamine is used. 26 Grams (53 percent yield) of an amber liquid is recovered. Analysis of the product gives 54.95 percent carbon, 7.65 percent hydrogen, 21.24 percent nitrogen, 16.01 percent sulfur compared to 54.78 percent carbon, 7.66 percent hydrogen, 21.30 percent nitrogen, 16.25 percent sulfur calculated for $C_9H_{15}N_3S$.

The following table illustrates the improved processing properties obtained by incorporating the new compounds into rubber. The Mooney scorch times at 250°F are determined by means of a Mooney Plastometer. The time $t_5$ in minutes required for the Mooney reading to rise 5 points above the minimum viscosity is recorded. Longer times on the Mooney scorch test are indicative of greater processing safety. The cure characteristics of the stocks are determined by a Monsanto Oscillating Disk Rheometer at 292°F. The time $t_2$ in minutes required for a rise of 2 rheometer units above the minimum reading and the time $t_{90}$ required to obtain 90 percent of the rheometer maximum torque are recorded. The difference, $t_{90}-t_2$, is indicative of the cure rate of the stocks. Small values of $t_{90}-t_2$ indicate faster cure rates. The vulcanization rate $K_2$ is measured in reciprocal minutes. See Coran, 37 Rubber Chemistry and Technology 689 (1964). Higher values of $K_2$ indicate higher rates of cross link formation. Vulcanizates are prepared by press curing the stocks at 292°F for the time required to achieve optimum cure as indicated from the rheometer data and the physical properties of the vulcanizate are measured and recorded.

TABLE I

| Stock No. | 1 | 2 | 3 | 4 |
|---|---|---|---|---|
| Natural Rubber Smoked sheets | 100.0 | → | → | → |
| ISAF Carbon Black | 45.0 | → | → | → |
| Zinc Oxide | 3.0 | → | → | → |
| Stearic Acid | 2.0 | → | → | → |
| Hydrocarbon Softener | 5.0 | → | → | → |
| N-(1,3-Dimethylbutyl)-N'-phenyl-p-phenylenediamine | 2.0 | → | → | → |
| Sulfur | 2.0 | → | → | → |
| N-*tert*-Butyl-2-benzothiazolesulfenamide | 0.5 | → | → | → |
| 2-(*tert*-Butylaminothio)-4,6-dimethylpyrimidine | — | 0.5 | — | — |
| 2-(Cyclohexylaminothio)-4,6-dimethylpyrimidine | — | — | 0.5 | — |
| 2-(Isopropylaminothio)-4,6-dimethylpyrimidine | — | — | — | 0.5 |
| Mooney Data at 250°F | | | | |
| $t_5$, minutes | 28.2 | 50.0 | 43.5 | 44.4 |
| % Increase in Scorch Delay | — | 77 | 54 | 50 |
| Rheometer Data at 292°F | | | | |
| $t_2$, minutes | 9.2 | 12.0 | 11.6 | 11.5 |
| $t_{90}-t_2$ | 13.0 | 12.2 | 9.2 | 9.2 |
| $K_2$ | 0.19 | 0.46 | 0.43 | 0.46 |
| Maximum torque | 49.5 | 59.5 | 59.2 | 60.0 |
| Stress-Strain Data at 292°F | | | | |
| Cure Time, minutes | 35 | 30 | 30 | 30 |
| 300% Modulus, psi | 1340 | 1660 | 1740 | 1700 |
| Ultimate Tensile Strength, psi | 3800 | 4000 | 3850 | 4100 |
| Ultimate Elongation, % | 580 | 540 | 510 | 550 |

TABLE II

| Stock No. | 1 | 2 | 3 | 4 |
|---|---|---|---|---|
| Natural rubber smoked sheets | 100.0 | → | → | → |
| ISAF Carbon Black | 45.0 | → | → | → |
| Zinc Oxide | 3.0 | → | → | → |
| Stearic Acid | 2.0 | → | → | → |
| Hydrocarbon Softener | 5.0 | → | → | → |
| Sulfur | 2.0 | → | → | → |
| N-(1,3-Dimethylbutyl)-N'-phenyl-p-phenylenediamine | 2.0 | → | → | → |
| N-*tert*-Butyl-2-benzothiazolesulfenamide | 0.5 | → | → | → |
| 2-(2,6-Dimethylmorpholinothio)-4,6-dimethylpyrimidine | — | 0.5 | — | — |
| 2-(Morpholinothio)-4,6-dimethylpyrimidine | — | — | 0.5 | — |
| 2-(Hexahydro-1H-azepin-1-ylthio)-4,6-dimethylpyrimidine | — | — | — | 0.5 |
| Mooney Data at 250°F | | | | |
| $t_5$, minutes | 30.6 | 36.2 | 36.9 | 33.2 |
| % Increase in Scorch Delay | — | 18 | 21 | 8.5 |

TABLE II—Continued

| Stock No. | 1 | 2 | 3 | 4 |
|---|---|---|---|---|
| Rheometer Data at 292°F | | | | |
| $t_2$, minutes | 7.9 | 8.3 | 8.4 | 7.8 |
| $t_{90}$, minutes | 20.2 | 17.3 | 17.0 | 15.2 |
| $t_{90}-t_2$ | 12.3 | 9.0 | 8.6 | 7.4 |
| Maximum torque | 53.6 | 61.0 | 62.3 | 65.0 |
| Minimum torque | 4.2 | 3.7 | 3.8 | 4.0 |

The data show the inhibitors derived from primary amines are more active than those derived from heterocyclic amines and that in addition to increasing processing safety, the prevulcanization inhibitors also activate the cure. Results comparable to those in the above table are obtained with other compounds of the invention and also in stocks prepared from styrene-butadiene rubber.

Although the invention has been illustrated by typical examples, it is not limited thereto. Changes and modifications of examples herein chosen for purposes of disclosure can be made which do not constitute departure from the spirit and scope of the invention.

The embodiment of the invention in which an exclusive property or privilege is claimed are defined as follows:

1. A vulcanizable composition comprising a sulfur vulcanizable diene rubber, a sulfur vulcanizing agent, an accelerating agent selected from the group consisting of thiazole accelerators, dithiocarbamate accelerators, thiuram sulfide accelerators, aldehyde-amine accelerators, diaryl guanidine accelerators and mixtures thereof in an amount effective to accelerate vulcanization and an amount effective to inhibit premature vulcanization a compound of the formula

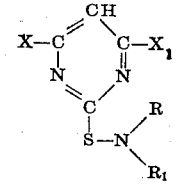

wherein X and $X_1$ independently are hydrogen or lower alkyl, R is hydrogen $R_1$ is alkyl of 1 to 20 carbon atoms, aralkyl of 7 to 10 carbon atoms and cycloalkyl of 5 to 12 carbon atoms.

2. A composition of claim 1 wherein the accelerating agent is a benzothiazolesulfenamide.

3. A composition of claim 1 wherein X and $X_1$ are methyl.

4. A composition of claim 3 wherein R is hydrogen and $R_1$ is lower alkyl.

5. A composition of claim 3 wherein R is hydrogen and $R_1$ is cyclohexyl.

6. A composition of claim 4 wherein $R_1$ is tert-butyl.

* * * * *